Aug. 25, 1936.  A. C. LEATHERS  2,051,953
NUT AND DETACHABLE HANDLE
Filed June 10, 1935  2 Sheets-Sheet 1
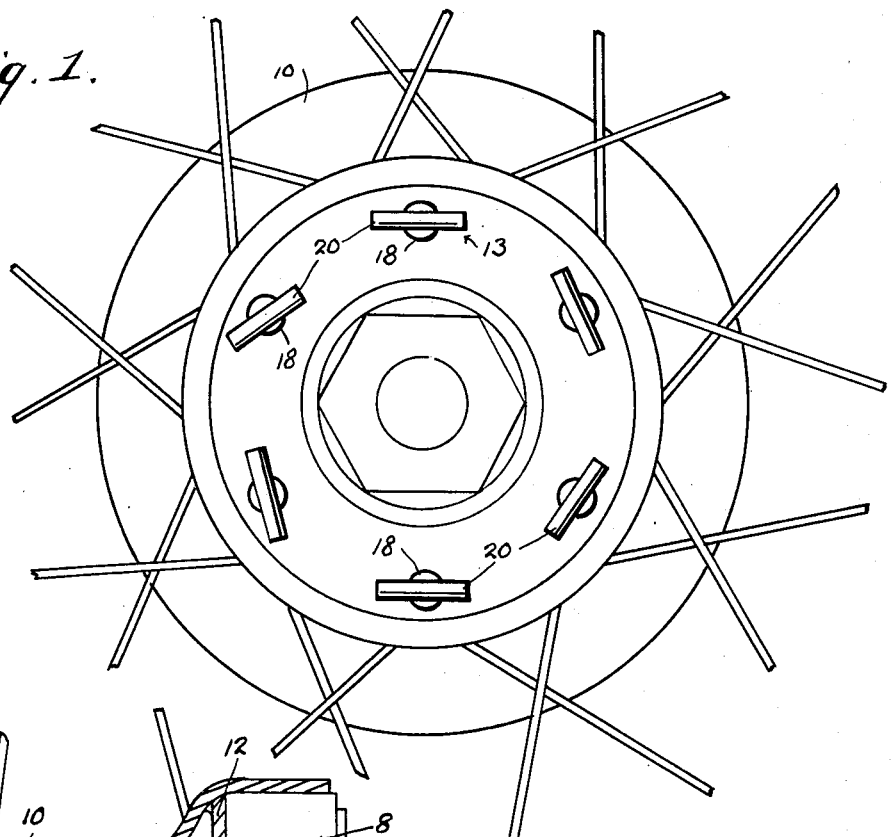
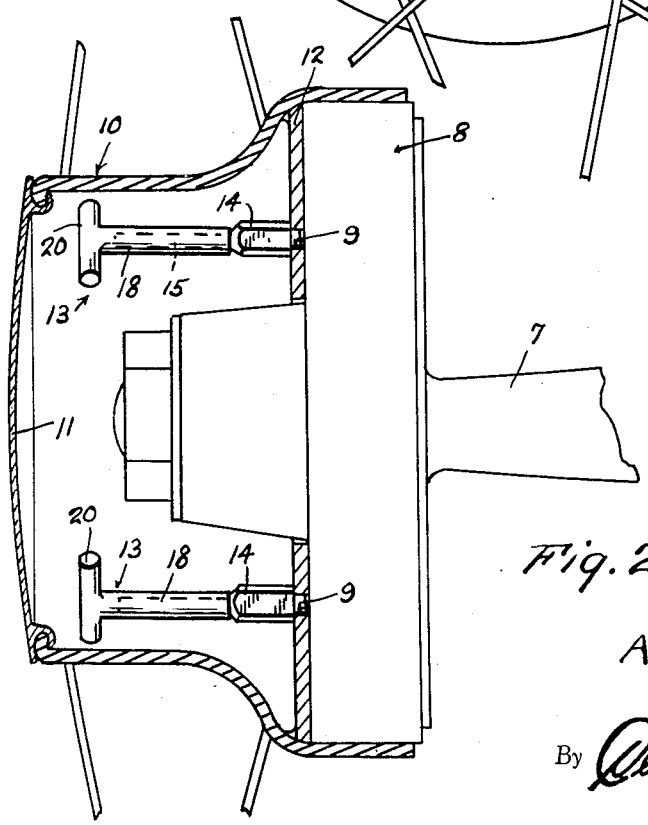
Inventor
A. C. Leathers
By Clarence A O'Brien
Attorney Aug. 25, 1936.    A. C. LEATHERS    2,051,953
NUT AND DETACHABLE HANDLE
Filed June 10, 1935    2 Sheets-Sheet 2
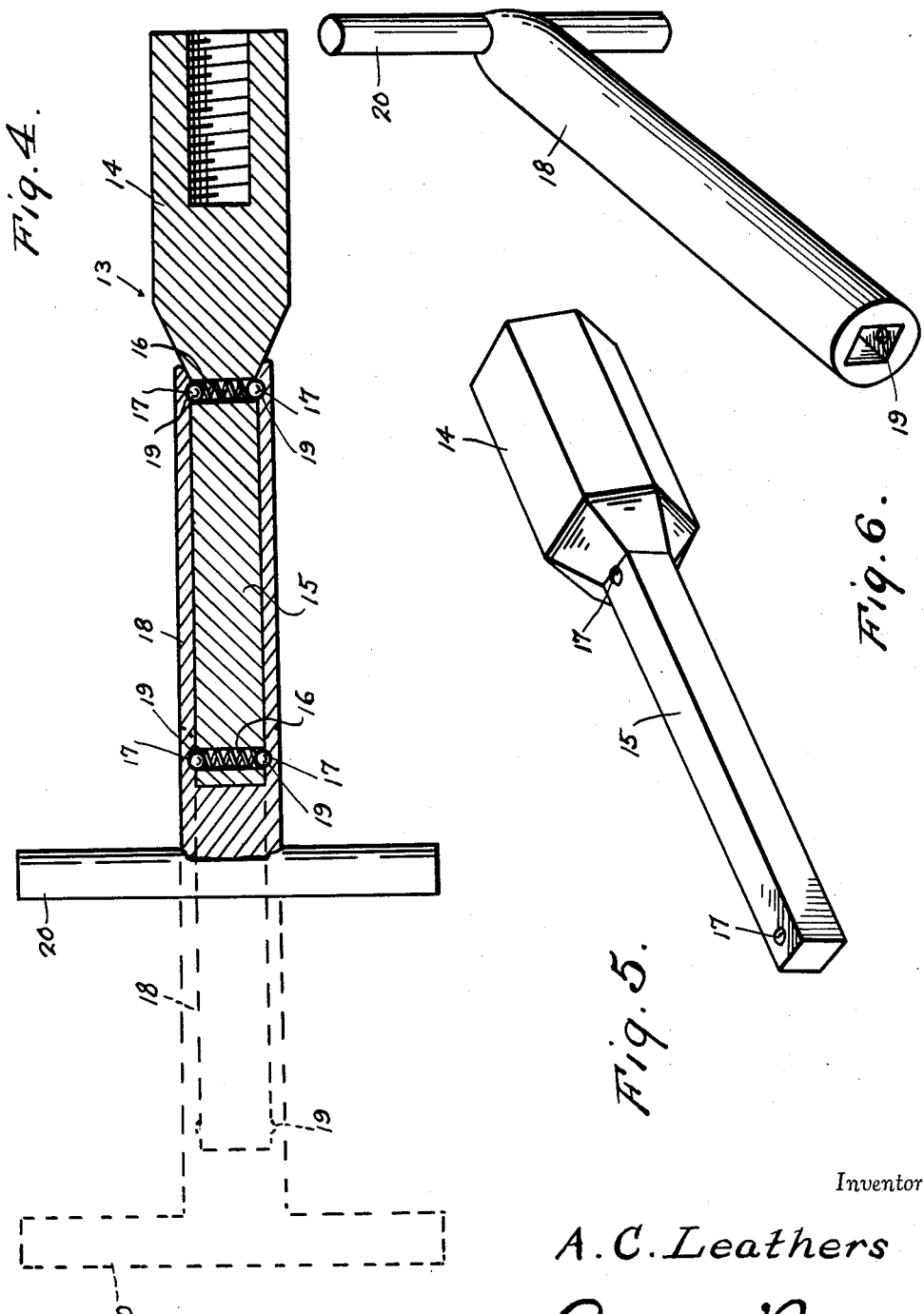
Inventor
A. C. Leathers
By Clarence A. O'Brien
Attorney Patented Aug. 25, 1936

2,051,953

UNITED STATES PATENT OFFICE 2,051,953

NUT AND DETACHABLE HANDLE

Arney Charles Leathers, Detroit, Mich.

Application June 10, 1935, Serial No. 25,916

1 Claim. (Cl. 85—32)

This invention relates to that classification of vehicle wheels of the so-called demountable wire spoke variety such as are extensively used at the present time on automobiles and the like, though it has more specific reference to novel fastening or retention means for adequately securing the conventional sheet metal shell or hub to the complemental supporting axle structure.

Those conversant with this particular line of endeavor are cognizant with the generally accepted method for accomplishing this wherein retaining nuts and lugs are located within the confines of the hollow shell and attached to screw threaded maintenance studs on the axle structure. When attaching and removing wheels for tire repair and replacement purposes a special lug wrench, or crank equipped socket wrench must be utilized. This venture, as is well known, has its vexating aspects in that the tools required for the purpose are not always handy, and even when readily available subject the user to unusual painstaking effort frequently resulting in a needless loss of time and inconvenience, not to speak of wear and tear on apparel and disposition.

In my quest for a structure which would overcome these laborious tasks, I have discovered what I believe to be a vast improvement, which though quite simple and economical, is aptly fitted for the purposes intended, and to my mind, is an unequaled achievement in this line of endeavor characterized by appreciable and exclusive and distinguishing features.

Structurally related, the preferred embodiment of the invention calculated to fulfill the requirements of the trade and the user has to do with the adoption and use of longitudinally extensible and retractible devices which are in effect handle-equipped retaining nuts for cooperation with the existing or stock studs, said devices being completely housed, when not in use, in the wheel hub in readiness for use if and when needed.

Other features and advantages will become more readily apparent from the following description and drawings:

In the accompanying drawings wherein like numerals are employed to designate like parts throughout the views:

Figure 1 is an elevational view showing the wheel hub structure with the hub cap removed to disclose the assembly of special retention devices on the interior of the hub or shell.

Figure 2 is a vertical sectional view taken at right angles to Figure 1 parts being in elevation, to illustrate the principle of application and use.

Figure 3 is an end elevational view of one of the retention devices per se.

Figure 4 is a longitudinal sectional view illustrating on a slightly enlarged scale the assemblage of parts or sections constituting the complete tool or device.

Figures 5 and 6 are perspective illustrations of the parts or sections of the device separated from one another.

Referring now to the drawings by distinguishing reference numerals and in particular to Figure 2, it will be observed that the axle, which is conventional, is denoted by the numeral 7. Associated with this is the regulation or standard type axle flange and brake drum structure 8 carrying the customary clamping or retaining studs 9 for the automobile wheels. The wheel as before intimated is of the regulation wire spokes type and includes the usual sheet metal shell or hub 10 and hub cap 11. The abutment diaphragm or disk is indicated at 12 and bears against the supporting brake drum structure 8, being provided with the regular apertures through which the studs 9 protrude. Ordinarily different types of lugs and clamping nuts are connected with these studs 9 to hold the hub structure 10 firmly on the axle structure. In removing the wheel the hub cap 11 is removed to permit access to be had to the lugs or nuts as the case may be. As previously stated, it requires the use of a special tool or wrench. My idea is to do away with the usual lugs and to provide special retaining devices or units 13 connectible with the studs 9. Each device is the same in construction and a description of one will suffice for all. One section of the device is illustrated in Figure 5 and comprises a socketed head 14 which is in effect a clamping or retaining nut, this being connectible directly with the stud 9. It is provided with an extension or shank 15 and the shank as shown in Figure 4 has longitudinally spaced bores or passages to accommodate coiled springs 16 which coact with spring pressed balls 17 which function as keepers or latches. Incidentally, any suitable resilient catches or equivalent means may be employed with requisite satisfaction. Fitting telescopically and slidably over the shank 15 is the sleeve 18 of the companion section of the device. This has a polygonal bore to receive the correspondingly shaped shank 15. Moreover it is provided with depressions 19 which function as keeper seats for the reception of the spring pressed balls 17. On the outer end of the sleeve is an integral hand grip 20 for convenient manipulation of the device.

Considered collectively and as a unit, the device 13 may be broadly described as an extensible and retractible retention means detachably connectible with the complemental studs 9. Or stated otherwise the tool per se may be defined as a clamping nut having a shank for a telescopically mounted tool handle retractible to an out-of-the-way position when not in use and extensible to a convenient grasping and using position when in use.

Novelty is thought to reside in the coordination or combination of the axle structure equipped with the stationary fastening studs 9, the conventional hollow shell or hub 10 of the wheel, the removable protective cap 11 and the handle equipped stud clamping units or devices 13 normally housed within the hub 10, but extensible when desired outwardly beyond the hub 10 to provide requisite leverage for removal and application of said devices 13, whereby to make for expeditious wheel exchange.

In accordance with my version and upon undertaking this practical and useful venture, I have evolved and produced a novel means of a versatile character which is practicable, efficient and otherwise suitable in measuring up to the standards required. I shall not, however, enter into a more prolonged discussion of the commercial phases of the development, for it is believed that these are self-evident.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

A device of the class described comprising an internally threaded nut having an integral shank of polygonal shape in vertical cross section, said shank having spaced transverse bores therein adjacent each end thereof, a pair of ball bearings in each of said bores, said bores being reduced in cross section adjacent the outer portion of the shank for securing said balls in said bores and permitting only a portion of the balls to project beyond the surface of the shank, resilient means normally urging said balls outwardly, a sleeve fitted slidably but non-rotatably on said shank, said sleeve having spaced depressions therein in which there are receivable the projected portion of said ball bearings for retaining said sleeve on said shank, and a handle on said sleeve on the outer end thereof.

ARNEY CHARLES LEATHERS.